United States Patent
Youtz et al.

(10) Patent No.: US 10,887,938 B1
(45) Date of Patent: Jan. 5, 2021

(54) SYSTEMS AND METHODS FOR NETWORK SELECTION AND REGISTRATION BASED ON VOICE SERVICE TYPE SUPPORT

(71) Applicant: Verizon Patent and Licensing Inc., Arlington, VA (US)

(72) Inventors: Andrew E. Youtz, Princeton, NJ (US); Deepa Jagannatha, Bridgewater, NJ (US); Jun Yuan, Cranbury, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/682,993

(22) Filed: Nov. 13, 2019

(51) Int. Cl.
*H04W 76/16* (2018.01)
*H04W 36/00* (2009.01)
*H04W 88/06* (2009.01)

(52) U.S. Cl.
CPC ....... *H04W 76/16* (2018.02); *H04W 36/0027* (2013.01); *H04W 88/06* (2013.01)

(58) Field of Classification Search
CPC .. H04W 76/16; H04W 88/06; H04W 36/0027
USPC ............................. 455/432.1–445, 450–452.2
See application file for complete search history.

(56) References Cited

U.S. PATENT DOCUMENTS

| | | | |
|---|---|---|---|
| 9,344,933 B1* | 5/2016 | Velusamy | H04W 24/04 |
| 2012/0044867 A1* | 2/2012 | Faccin | H04W 60/00 370/328 |
| 2015/0045025 A1* | 2/2015 | Lim | H04W 72/0413 455/434 |
| 2016/0029303 A1* | 1/2016 | Sahu | H04W 36/14 370/331 |
| 2019/0037617 A1* | 1/2019 | Kapatralla | H04W 60/04 |
| 2019/0059026 A1* | 2/2019 | Huang-Fu | H04W 36/08 |
| 2019/0394245 A1* | 12/2019 | Niemi | H04L 65/40 |

OTHER PUBLICATIONS

3GPP TS 24.501 V1.1.0, "3rd Generation Partnership Project; Technical Specification Group Core Network and Terminals; Non-Access-Stratum (NAS) protocol for 5G System (5GS); Stage 3 (Release 15)," May 2018.
ETSI TS 124 501 V15.3.0, "5G; Non-Access-Stratum (NAS) protocol for 5G System (5GS); Stage 3 (3GPP TS 24.501 version 15.3.0 Release 15)," May 2019.

* cited by examiner

*Primary Examiner* — Michael Y Mapa

(57) ABSTRACT

A system described herein may provide a technique for allowing User Equipment ("UE") to connect to base stations of a wireless network based on base station support for packet switched ("PS") one or more voice service types that are implemented by the UE. The UE may indicate one or more PS voice types implemented by the UE when registering with the base station. Additionally, or alternatively, the base station may broadcast an indicator of the type(s) of PS voice supported by the base station, based on which the UE may determine whether to register with the base station.

20 Claims, 10 Drawing Sheets

SYSTEMS AND METHODS FOR NETWORK SELECTION AND REGISTRATION BASED ON VOICE SERVICE TYPE SUPPORT

BACKGROUND

Wireless user equipment ("UE"), such as mobile telephones or other wireless communication devices, may provide voice call services. Different types of voice call services may be supported by a wireless telecommunications network and/or by different types of UEs. For example, some networks and/or UEs may support various packet switched ("PS") voice services, such as Voice over Long-Term Evolution ("VoLTE") and/or Voice over New Radio ("VoNR"). Some networks and/or UEs may not support PS voice services.

DETAILED DESCRIPTION OF THE PREFERRED EMBODIMENTS

The following detailed description refers to the accompanying drawings. The same reference numbers in different drawings may identify the same or similar elements.

Currently, no known mechanism exists for UEs and/or base stations to ascertain what type of packet switched ("PS") voice service, such as Voice over Long-Term Evolution ("VoLTE"), Voice over New Radio ("VoNR"), and/or some other PS voice service, is supported by a base station, and/or for a User Equipment ("UE") to indicate a preference between multiple types of PS voice service types. Embodiments described herein provide a technique that allows a UE and/or a base station of a wireless network to identify whether the base station supports a particular type of voice service (e.g., a particular PS voice service type) that is implemented by the UE.

Figure 1:
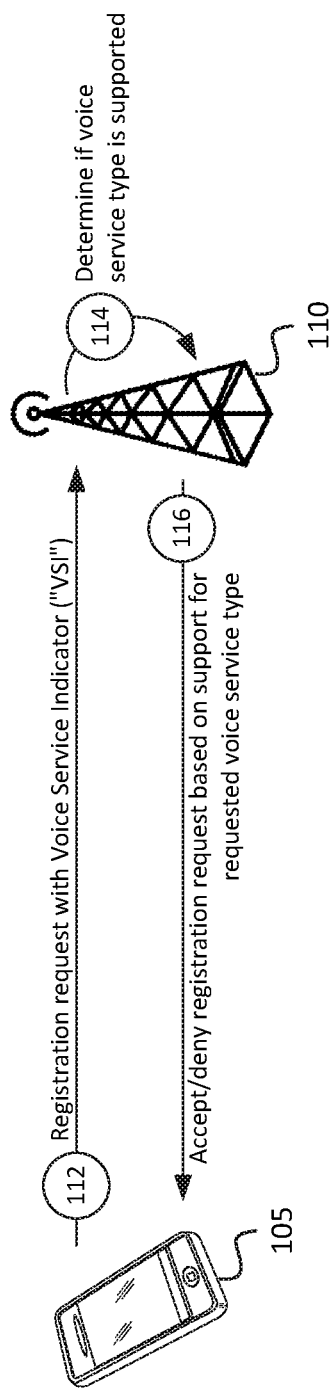
FIGS. 1 and 2 illustrate examples of one or more embodiments described herein, in which a base station may accept or deny a registration request from a UE based on a Voice Service Indicator ("VSI") provided by the UE.

As shown in FIG. 1, for example, UE 105 may request (at 112) registration with base station 110. As part of the registration process, UE 105 may send one or more Non-Access Stratum ("NAS") messages. In accordance with some embodiments, UE 105 may indicate (e.g., via NAS messaging during the registration process and/or some other suitable type of messaging) a Voice Service Indicator ("VSI"). In some embodiments, UE 105 may include the VSI in one or more other types of messaging in addition to, or in lieu of, NAS messaging (e.g., Radio Resource Control ("RRC") messaging and/or some other suitable messaging technique). As described herein, the VSI may indicate one or more types of voice service types implemented or supported by UE 105 (e.g., VoLTE, VoNR, both, or neither).

Base station 110 may determine (at 114) whether the VSI, provided by UE 105, indicates a particular voice service type that is supported by base station 110. For example, base station 110 may maintain information indicating the type, or types, of voice service supported by base station 110 (and/or may be communicatively coupled with one or more devices or systems that maintain information indicating the type(s) of voice service supported by base station 110, such as an Mobility and Management Entity ("MME"), an Access and Mobility Management Function ("AMF"), and/or some other device or system), and may use this information to determine whether the VSI indicates one or more of the types of voice service supported by base station 110.

Base station 110 may accept or deny (at 116) the registration request based on whether base station 110 supports the type, or types, of voice service indicated by the VSI. In this manner, scenarios are prevented where UE 105 and base station 110 both implement and/or support PS voice services, but base station 110 does not support the type (or types) of PS voice service implemented by UE 105, resulting in an inability to conduct a PS voice call via base station 110.

Figure 2:
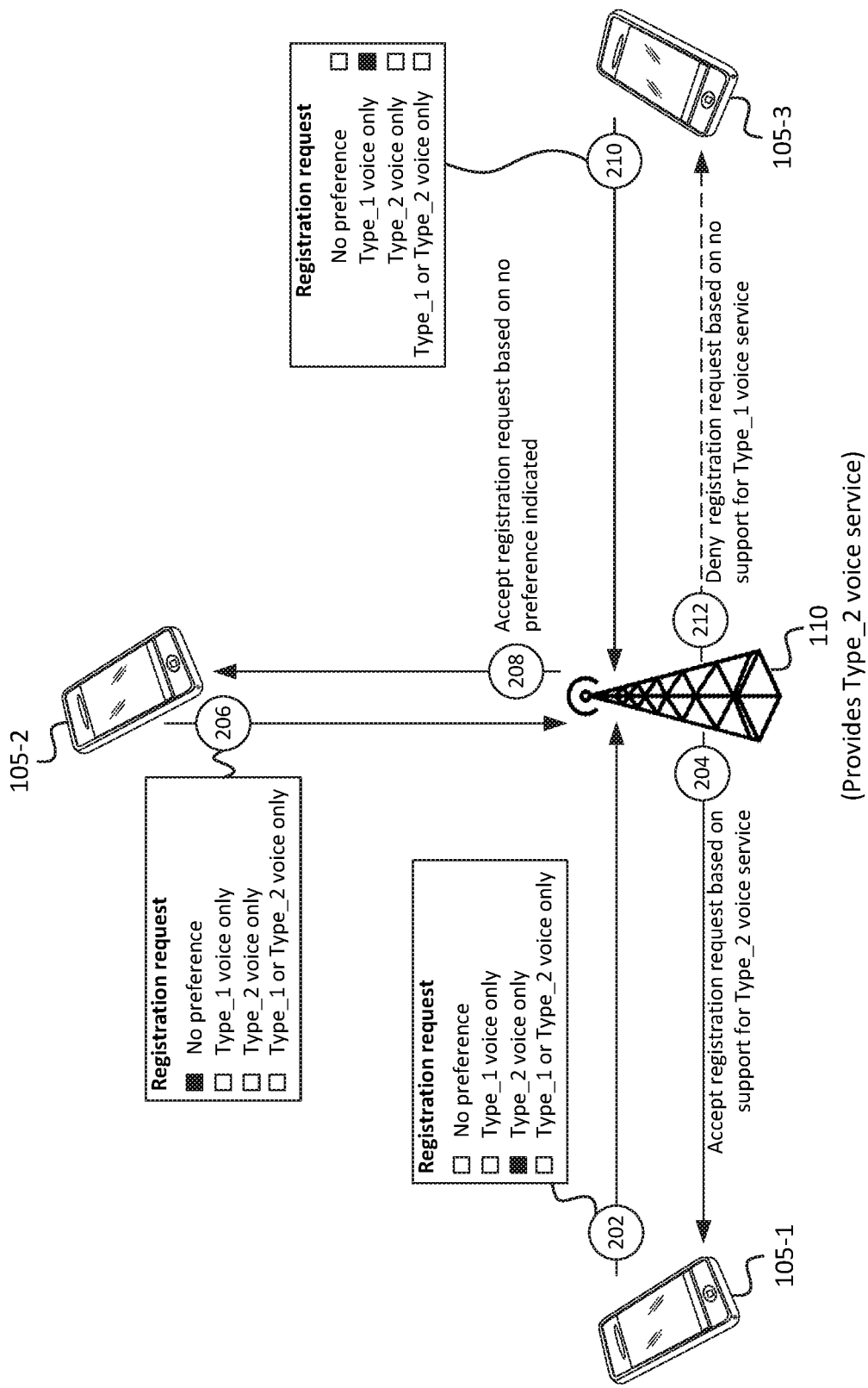

FIG. 2 provides a further example of base station 110 accepting or denying registration requests from UEs 105-1, 105-2, and 105-3 (collectively referred to as "UEs 105") based on VSIs provided by UEs 105 as part of a registration process. In the example shown here (and as described below), two bits may be used for the VSI, resulting in four possible VSIs. In practice, a different number of bits may be used for the VSI (e.g., three bits, four bits, or more). As shown in FIG. 2, the four example VSIs are "Type_1 voice only," "Type_2 voice only," "Type_1 or Type_2 voice only," and "No preference." In some embodiments, "Type_1" and "Type_2" may refer to VoLTE and VoNR voice service types. In some embodiments, "Type_1" and/or "Type_2" may refer to one or more other PS voice service types.

The indication of a particular voice service type, by a VSI, may indicate a requirement that that particular voice service type is supported by base station 110. For example, as shown, UE 105-1 may output (at 202) a registration request, which may include a VSI that indicates "Type_2 voice only." In this example, assume that base station 110 supports Type_2 voice service (and not Type_1 voice service). Base station 110 may accept (at 204) the registration request from UE 105-1, based on supporting the voice service type indicated in the VSI (provided at 202).

As further shown, UE 105-2 may output (at 206), a registration request including a VSI that indicates "No preference." This value for the VSI may indicate that no particular PS voice service type is required, and may further indicate that PS voice service is not required by UE 105-2. That is, whether base station 110 supports Type_1 voice service, Type_2 voice service, or no type of PS voice service, base station 110 would satisfy the "No preference" value for the VSI. Based on the "No preference" value for the VSI provided by UE 105-2, base station 110 may accept (at 208) the registration request. In some embodiments, a given UE 105 may not include a VSI in a registration request, which may be interpreted by base station 110 in a similar manner as a "No preference" value for a VSI (e.g., forgo denying the registration request based on voice service type support).

As also shown in FIG. 2, UE 105-3 may output (at 210) a registration request, with a VSI that indicates "Type_1 voice only." Since base station 110 does not support Type_1 voice service, base station 110 may deny (at 212) the registration request for UE 105-3. In some embodiments, UE 105-3 may store an indication that base station 110 does not support Type_1 voice service. Based on this indication, UE 105-3 may subsequently refrain from attempting to register with base station 110.

Examples discussed herein, including those discussed above, sometimes refer to a registration process as being "completed" based on base station 110 support for a voice service type that is implemented or required by UE 105. It is to be understood that the term "completed," as used herein, may refer to a registration process not being denied on the basis of voice service type. However, in some scenarios, such registration processes may be denied (or otherwise fail) for different reasons (e.g., reasons independent of whether base station 110 supports a voice service type that is implemented or required by UE 105).

Figure 3:
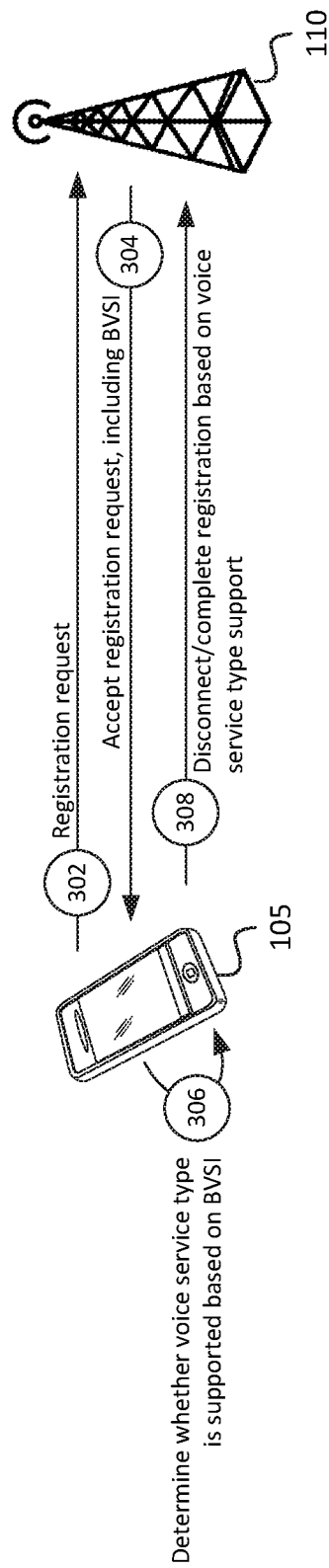
FIG. 3 illustrates an example overview of one or more embodiments described herein, in which a UE may complete and/or refrain from completing a registration process with a base station based on a base station VSI ("BVSI") provided by the base station during the registration process.

In some embodiments, base station 110 may provide a base station VSI ("BVSI") to UE 105 during a registration process (e.g., in lieu of UE 105 providing a VSI to base station 110). For example, as shown in FIG. 3, UE 105 may output (at 302) a registration request to base station 110 (e.g., where the registration request does not include a VSI). In this example, assume that base station 110 accepts the registration request. Base station 110 may output (at 304) one or more messages (e.g., a NAS message, an RRC message, and/or some other suitable message) that includes a BVSI, the value of which may indicate one or more types of PS voice services supported by base station 110. For instance, in some embodiments, the BVSI may be a two-bit value, where each bit corresponds to a particular voice service type. For example, a first bit may indicate support for a first voice service type (e.g., a value of "1" for the first bit may indicate support for Type_1 voice service, while a value of a value of "0" for the first bit may indicate no support for Type_1 voice service), while a second bit may indicate support for a second voice service type.

As further shown, UE 105 may determine (at 306) whether the voice service type (or types) implemented by UE 105 is/are supported by base station 110, based on the BVSI. UE 105 may complete (at 308) the registration process with base station 110 when the BVSI indicates support for the voice service type(s) implemented by UE 105 (and/or may remain connected, if UE 105 and base station 110 have completed the registration process). If, on the other hand, the BVSI does not indicate support for the voice service type(s) implemented by UE 105, UE 105 may terminate the registration process (e.g., prior to completion of the registration process), and/or may disconnect from base station 110 (e.g., if the registration process has already been completed).

Figure 4:
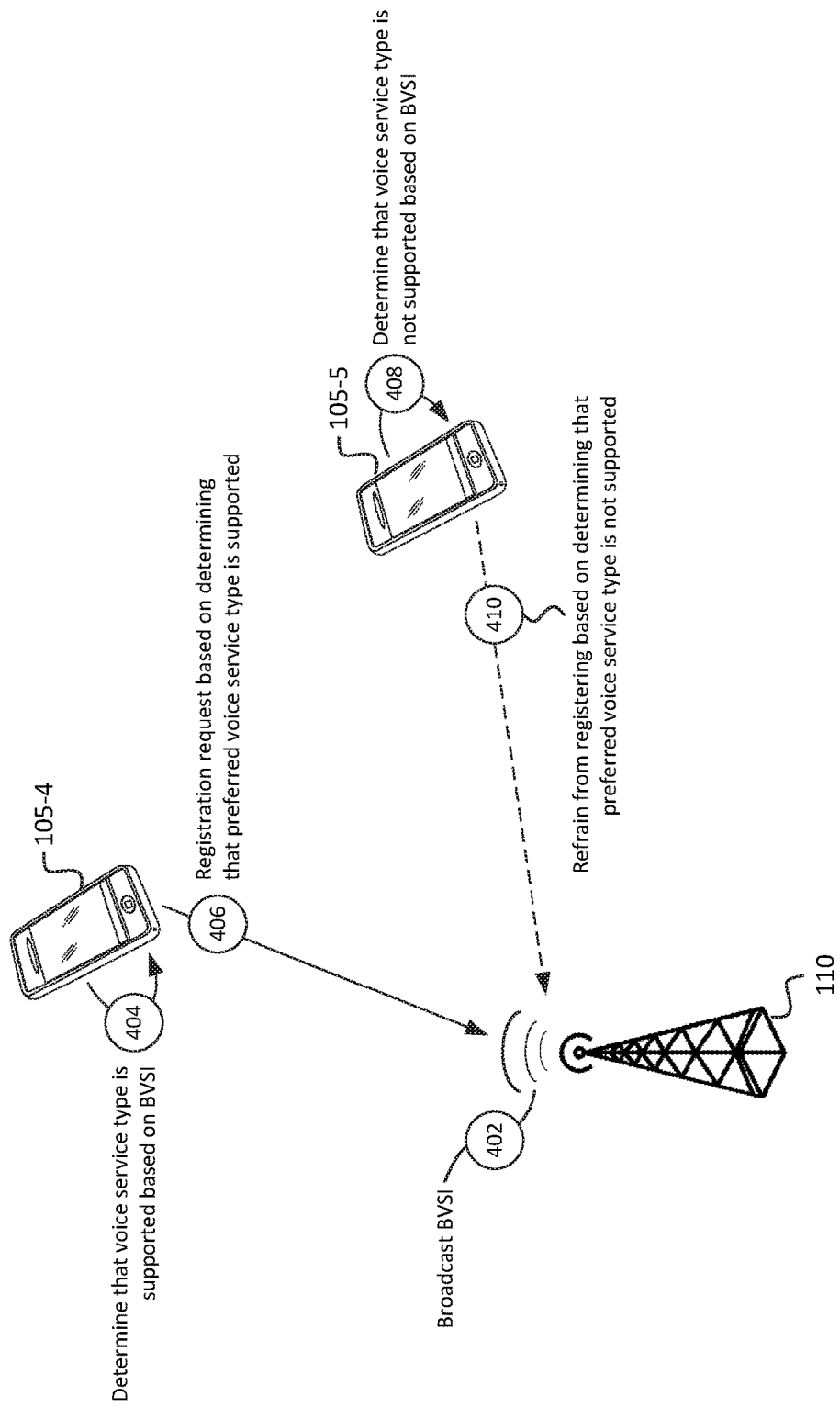
FIG. 4 illustrates an example overview of one or more embodiments described herein, in which a base station may broadcast a BVSI, such that a UE may determine whether to request registration with the base station based on whether the BVSI indicates a voice service type supported by the UE.

In some embodiments, as shown in FIG. 4 for example, base station 110 may broadcast a BVSI. For example, base station 110 may broadcast (at 402) the BVSI via a Master Information Block ("MIB"), a System Information Block ("SIB"), and/or via some other suitable technique. As further shown, UE 105-4 may determine (at 404), based on the broadcasted BVSI, that one or more voice service types, implemented by UE 105-4, is supported by base station 110. Based on this determination, UE 105-4 may request (at 406) registration with base station 110 (and/or may not forgo registering with base station 110 on the basis of voice service type).

As also shown in FIG. 4, UE 105-5 may determine (at 408), based on the BVSI, that base station 110 does not support a voice service type implemented by UE 105-5. Based on this determination (i.e., on the basis of voice service type), UE 105-5 may refrain (at 410) from registering with base station 110. Additionally, in some embodiments, UE 105-5 may maintain information indicating that base station 110 does not support a voice service type implemented by UE 105-5, in order to refrain from registering with base station 110 in subsequent scenarios.

Figure 5:
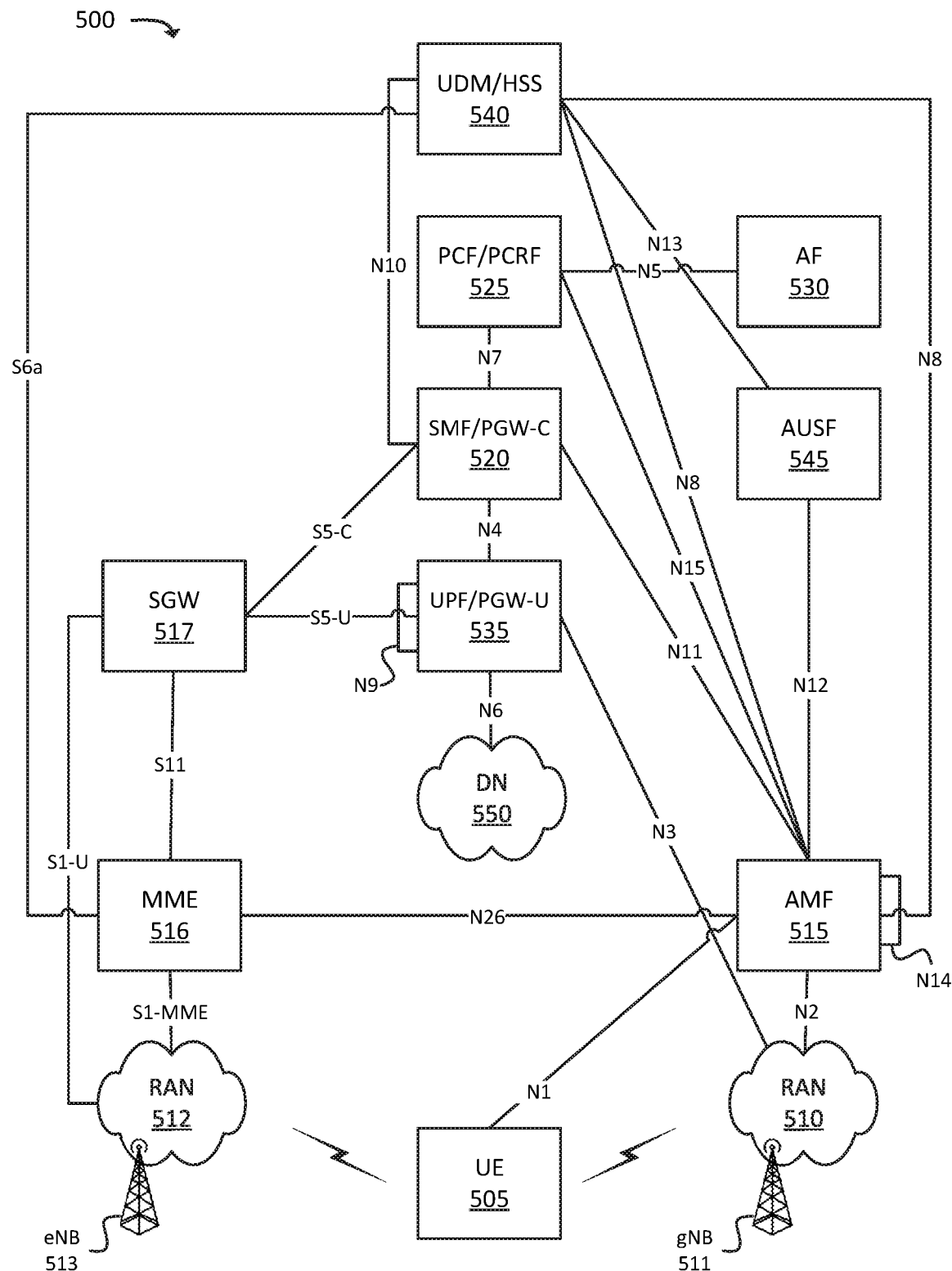
FIG. 5 illustrates an example environment in which one or more embodiments, described herein, may be implemented.

FIG. 5 illustrates an example environment 500 in which one or more embodiments may be implemented. In some embodiments, portions of environment 500 may correspond to a Non-Standalone ("NSA") Fifth Generation ("5G") architecture, in which both 5G elements and Long-Term Evolution ("LTE") elements interoperate to provide connectivity via LTE and 5G radio access technologies ("RATs"), and/or one or more other RATs. As shown, environment 500 may include UE 505, radio access network ("RAN") 510 (which may include one or more base stations, which may take the form of evolved Next Generation Node Bs ("gNBs") 511), RAN 512 (which may include one or more base stations, which may take the form of evolved Node Bs ("eNBs"), AMF 515, MME 516, Serving Gateway ("SGW") 517, Session Management Function ("SMF")/PDN Gateway ("PGW") Control Plane Function ("PGW-C") 520, Policy Control Function ("PCF")/Policy Charging and Rules Function ("PCRF") 525, Application Function ("AF") 530, User Plane Function ("UPF")/PGW User Plane Function ("UPF-U") 535, Unified Data Management ("UDM")/Home Subscriber Server ("HSS") 540, Authentication Server Function ("AUSF") 545, and Data Network ("DN") 550.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 505 may include a computation and communication device, such as a wireless mobile communication device that is capable of wirelessly communicating with RAN 510, RAN 512, and/or some other wireless network. For example, UE 505 may include wireless circuitry that is capable of using a first RAT (e.g., a 5G RAT) to communicate with RAN 510, and wireless circuitry that is capable of using a second RAT (e.g., an LTE RAT) to communicate with RAN 512. In some embodiments, UE 505 may include wireless circuitry that is capable of using more than two different RATs to communicate with multiple types of wireless networks. In some embodiments, UE 505 may include wireless circuitry that is capable of using one RAT while not being capable of using another RAT (e.g., capable of communicating with RAN 510 but not capable of communicating with RAN 512, or vice versa).

UE 505 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, or the like), a wearable device, a Mobile-to-Mobile ("M2M") device, or another type of mobile computation and communication device. UE 505 may send traffic to and/or receive traffic (e.g., user plane traffic) from DN 550 via RAN 510 and/or RAN 512 and/or one or more other devices, systems, or networks.

RAN 510 may be, or may include, a 5G RAN that includes one or more base stations (e.g., one or more gNBs 511), via which UE 505 may communicate with one or more other elements of environment 500. UE 505 may communicate with RAN 510 via an air interface (e.g., as provided by gNB 511). For instance, RAN 510 may receive traffic (e.g., voice call traffic, data traffic, messaging traffic, signaling traffic, etc.) from UE 505 via the air interface, and may communicate the traffic to UPF/PGW-U 535, and/or one or more other devices or networks. Similarly, RAN 510 may receive traffic and/or signaling intended for UE 505 (e.g., from UPF/PGW-U 535, AMF 515, and/or one or more other devices or networks) and may communicate the traffic and/or signaling to UE 505 via the air interface.

RAN 512 may be, or may include, an LTE RAN that includes one or more base stations (e.g., one or more eNBs 513), via which UE 505 may communicate with one or more other elements of environment 500. UE 505 may communicate with RAN 512 via an air interface (e.g., as provided by eNB 513). For instance, RAN 512 may receive traffic (e.g., voice call traffic, data traffic, messaging traffic, signaling traffic, etc.) from UE 505 via the air interface, and may communicate the traffic to UPF/PGW-U 535, and/or one or more other devices or networks. Similarly, RAN 512 may receive traffic and/or signaling intended for UE 505 (e.g., from UPF/PGW-U 535, MME 516, and/or one or more other devices or networks) and may communicate the traffic and/or signaling to UE 505 via the air interface.

AMF 515 may include one or more devices, systems, Virtualized Network Functions ("VNFs"), etc., that perform operations to register UE 505 with the network, to establish bearer channels associated with a session with UE 505, to hand off UE 505 from the network to another network, to hand off UE 505 from the other network to the network, and/or to perform other operations. In some embodiments, environment 500 may include multiple AMFs 515, which communicate with each other via the N14 interface (denoted in FIG. 5 by the line marked "N14" originating and terminating at AMF 515).

MME 516 may include one or more devices, systems, VNFs, etc., that perform operations to register UE 505, to establish bearer channels associated with a session with UE 505, to hand off UE 505 to another network, to hand off UE 505 from another network, and/or to perform other operations. MME 516 may perform policing operations on traffic destined for and/or received from UE 505. MME 516 may, in some embodiments, receive messages via control plane signaling, which are destined to and/or sent from UE 505.

SGW 517 may include one or more devices, systems, VNFs, etc., that gather, process, search, store, and/or provide information in a manner described herein. SGW 517 may, for example, aggregate traffic received from one or more RANs 512 and/or eNBs 513, and may send the aggregated traffic to DN 550 (e.g., via UPF/PGW-U 535). SGW 517 may communicate with SMF/PGW-C 520 to establish sessions via which user plane traffic can be forwarded to and/or from UE 505 via RAN 512.

SMF/PGW-C 520 may include one or more devices, systems, VNFs, etc., that gather, process, store, and/or provide information in a manner described herein. SMF/PGW-C 520 may, for example, facilitate in the establishment of communication sessions on behalf of UE 505. In some embodiments, the establishment of communications sessions may be performed in accordance with one or more policies provided by PCF/PCRF 525.

PCF/PCRF 525 may include one or more devices, systems, VNFs, etc., that aggregate information to and from the 5G network and/or other sources. PCF/PCRF 525 may receive information regarding policies and/or subscriptions from one or more sources, such as subscriber databases and/or from one or more users (such as, for example, an administrator associated with PCF/PCRF 525).

AF 530 may include one or more devices, systems, VNFs, etc., that receive, store, and/or provide information that may be used in determining parameters (e.g., quality of service parameters, charging parameters, or the like) for certain applications.

UPF/PGW-U 535 may include one or more devices, systems, VNFs, etc., that receive, store, and/or provide data (e.g., user plane data). For example, UPF/PGW-U 535 may receive user plane data (e.g., voice call traffic, data traffic, etc.), destined for UE 505, from DN 550, and may forward the user plane data toward UE 505 (e.g., via RAN 510, RAN 512, SGW 517, and/or one or more other devices). In some embodiments, multiple UPF/PGW-Us 535 may be deployed (e.g., in different geographical locations), and the delivery of content to UE 505 may be coordinated via the N9 interface (e.g., as denoted in FIG. 5 by the line marked "N9" originating and terminating at UPF/PGW-U 535). Similarly, UPF/PGW-U 535 may receive traffic from UE 505 (e.g., via RAN 510, RAN 512, SGW 517, and/or one or more other devices), and may forward the traffic toward DN 550. In some embodiments, UPF/PGW-U 535 may communicate control signaling (e.g., via the N4 interface) with SMF/PGW-C 520, regarding user plane data handled by UPF/PGW-U 535.

AUSF 545 and UDM/HSS 540 may include one or more devices, systems, VNFs, etc., that manage, update, and/or store, in one or more memory devices associated with AUSF 545 and/or UDM/HSS 540, profile information associated with a subscriber. AUSF 545 and/or UDM/HSS 540 may perform authentication, authorization, and/or accounting operations associated with the subscriber and/or a communication session with UE 505.

DN 550 may include one or more wired and/or wireless networks. For example, DN 550 may include an Internet Protocol ("IP")-based PDN, a wide area network ("WAN") such as the Internet, a private enterprise network, and/or one or more other networks. UE 505 may communicate, through DN 550, with data servers, other UEs 505, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 505 may communicate.

Figure 6:
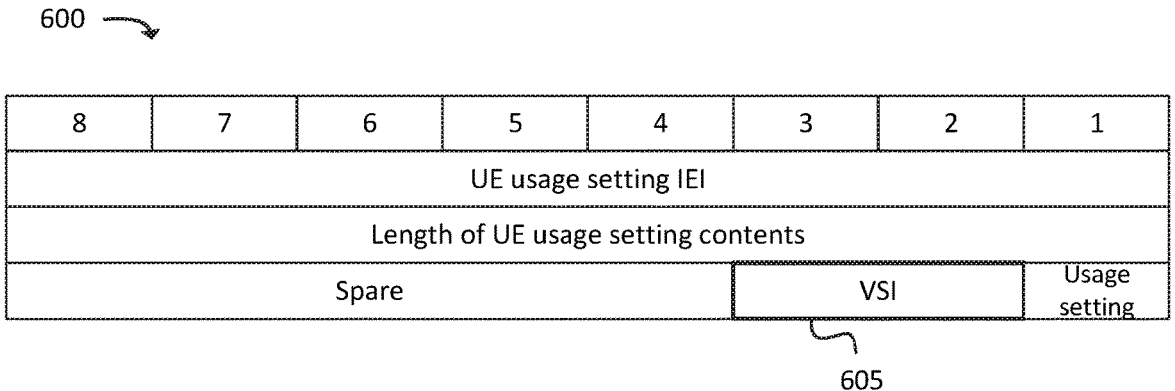
FIG. 6 illustrates an example Non-Access Stratum ("NAS") information element ("IE"), which indicates a VSI associated with a UE.

FIG. 6 illustrates an example data structure 600, in accordance with some embodiments, which may include VSI 605. In some embodiments, data structure 600 may correspond to a message (or a portion of a message) provided by UE 105 to base station 110 (e.g., to gNB 511, eNB 513, etc.) during a registration process. For example, data structure 600 may represent a NAS message, some portion thereof, and/or some other type of message. In some embodiments, an RRC message may include some or all of the information shown in data structure 600. In practice, a NAS message, an RRC message, and/or some other message may include some or all of the information shown in data structure 600. In some embodiments, data structure 600 may be, may include, and/or otherwise represent an Information Element ("IE"). For example, data structure 600 may represent an IE of a NAS REGISTRATION REQUEST message outputted by UE 105.

In some embodiments, data structure 600 may represent multiple octets of bits. In this figure, each bit of an octet (i.e., bits 1-8) are represented as columns, while octets are represented as rows. As shown, one octet may include an IE Identifier ("ID") that indicates that data structure 600 represents a "UE usage setting" IE, another octet that indicates a length of the IE (and/or a value that is derived from the total length of the IE, such as the total length in octets of the IE less two octets). As further shown, a third octet may include a "usage setting" bit, which may specify UE 105 as "voice-centric" or "data-centric."

In some embodiments, the third octet may also include VSI 605. As shown, VSI 605 may include two bits in some embodiments. In some embodiments, VSI 605 may include additional bits. The quantity of different possible VSIs may be a function of the quantity of bits used to indicate VSI 605 in data structure 600. In instances where two bits are used, up to four possible VSIs may indicated.

Figure 7:
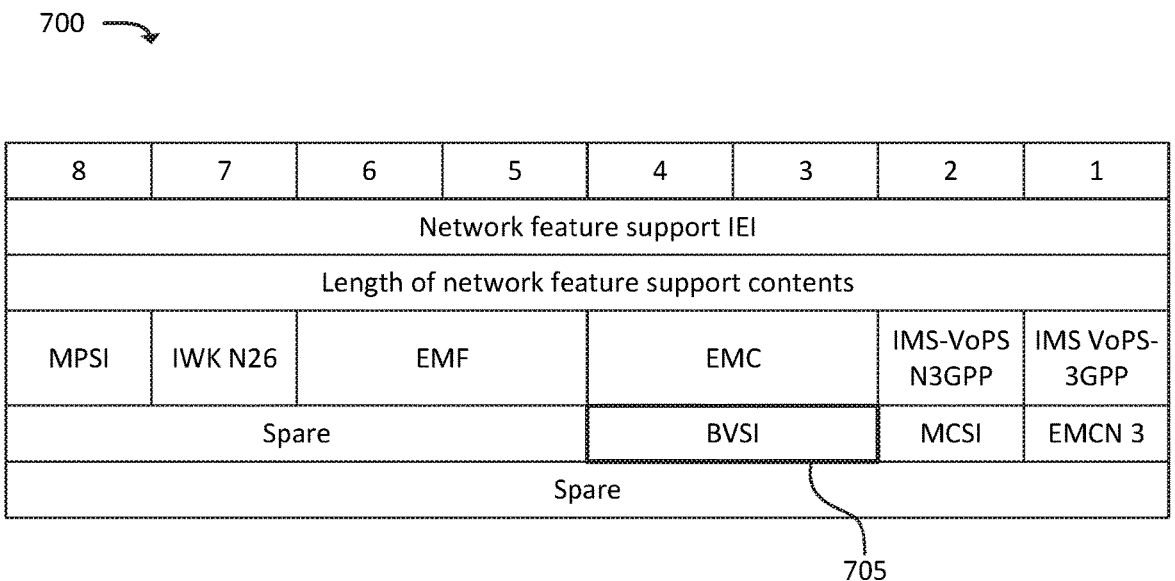
FIG. 7 illustrates an example NAS IE, which indicates a BVSI associated with a base station.

FIG. 7 illustrates an example data structure 700, in accordance with some embodiments, which may include BVSI 705. In some embodiments, data structure 700 may correspond to a message (or a portion of a message) provided by base station 110 to UE 105 during a registration process. For example, data structure 700 may represent a NAS message, some portion thereof, and/or some other type of message. In some embodiments, an RRC message may include some or all of the information shown in data structure 700. In practice, a NAS message, an RRC message, and/or some other message may include some or all of the information shown in data structure 700. In some embodiments, data structure 700 may be, may include, and/or otherwise represent an IE. For example, data structure 700 may represent an IE of a NAS REGISTRATION ACCEPT message outputted by base station 110.

As shown, one octet of data structure 700 may include an IEI that indicates that data structure 700 represents a "Network feature support usage" IE, another octet that indicates a length of the IE and/or a value that is derived from the total length of the IE. As further shown, third and fourth octets may include sets of bits used to indicate features supported by base station 110. In accordance with some embodiments, the fourth octet may include BVSI 705. In this example, BVSI 705 is indicated by two bits; in practice, BVSI 705 may be indicated by additional bits in data structure 700.

Figure 8:
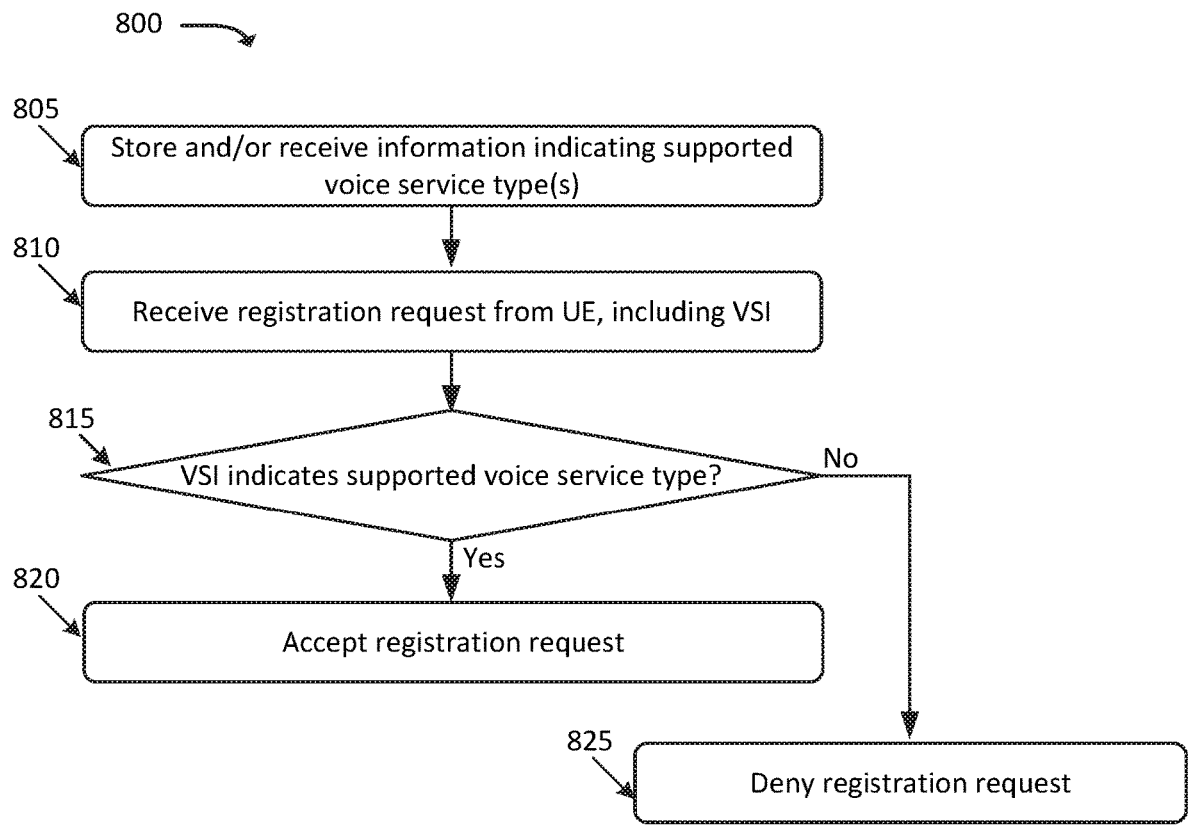
FIG. 8 illustrates an example process for accepting or denying a registration request from a UE based on a VSI provided by the UE.

FIG. 8 illustrates an example process 800 for accepting or denying a registration request from a UE based on a VSI provided by the UE. In some embodiments, some or all of process 800 may be performed by base station 110. In some embodiments, one or more other devices may perform some or all of process 800 (e.g., in concert with, and/or in lieu of, base station 110). For example, in some embodiments, portions of process 800 may be performed by AMF 515 and/or MME 516.

As shown, process 800 may include storing and/or receiving (at 805) information indicating supported voice service types. For example, base station 110 may be configured to store a BVSI and/or some other information that indicates voice service types supported by base station 110. In some embodiments, AMF 515 and/or MME 516 may be configured to store one or more BVSIs associated with one or more base stations 110.

Process 800 may further include receiving (at 810) a registration request from UE 105, including a VSI. For example, base station 110 may receive a registration request, which may include (and/or take the form of) a NAS REGISTRATION REQUEST message. As discussed above, the REGISTRATION REQUEST message may include a VSI. Additionally, or alternatively, the registration request may include an RRC CONNECTION REQUEST message, and may include a VSI. In some embodiments, the VSI may be received from one or more other sources. For example, base station 110 may receive the VSI from AMF 515 and/or MME 516. In some such embodiments, AMF 515 and/or MME 516 may store the VSI associated with UE 105 (e.g., as received from UE 105 via NAS signaling during a previous registration process, from HSS/UDM 540, and/or from some other source). In some embodiments, AMF 515 and/or MME 516 may receive the VSI (e.g., from UE 105, via base station 110).

Process 800 may additionally include determining (at 815) whether the VSI indicates a supported voice service type. For example, base station 110 may determine which voice service type(s) is/are indicated by the VSI, and determine whether the information (stored and/or received at 805) indicates a compatible voice service type (e.g., a voice service type that corresponds to the VSI). In some embodiments, AMF 515 and/or MME 516 may determine whether the VSI indicates the supported voice service type (e.g., in embodiments where AMF 515 and/or MME 516 receive the VSI at 810).

If the VSI indicates a supported voice service type (at 815—YES), then process 800 may include accepting (at 820) the registration request. For example, base station 110 may output a REGISTRATION ACCEPT message and complete the registration of UE 105. In some embodiments, AMF 515 and/or MME 516 may send the REGISTRATION ACCEPT message via base station 110. As mentioned above, in some situations, the registration may not be completed for other reasons; in these situations, the failure of the registration may not be based on the voice service support of base station 110. However, for the sake of simplicity, examples herein are described in the context of successfully completing the registration when the VSI indicates support for the type (or types) of voice service specified by the VSI.

If, on the other hand, the VSI does not indicate a supported voice service type (at 815—NO), then process 800 may include denying (at 825) the registration request. For example, base station 110 may output a message denying the registration request. In some embodiments, base station 110 may deny the registration request by not responding to the registration request, based on the determination that the VSI does not indicate a supported voice service type.

In some embodiments, some portions of process 800 need not be performed (e.g., in some scenarios when UE 505 is handed over from one base station 110 (e.g., gNB 511 and/or eNB 513) to another base station 110). For example, AMF 515 and/or MME 516 may maintain a VSI associated with UE 505, such that when UE 505 is handed to a base station 110 that is communicatively coupled with an AMF 515 and/or MME 516 that has already received the VSI associated with UE 110, AMF 515 and/or MME 516 may evaluate whether a particular base station 110 supports the voice service type(s) implemented by UE 505, and may instruct UE 505 to register with (or avoid registering with) the particular base station 110 based on the voice service support of base station 110.

Figure 9:
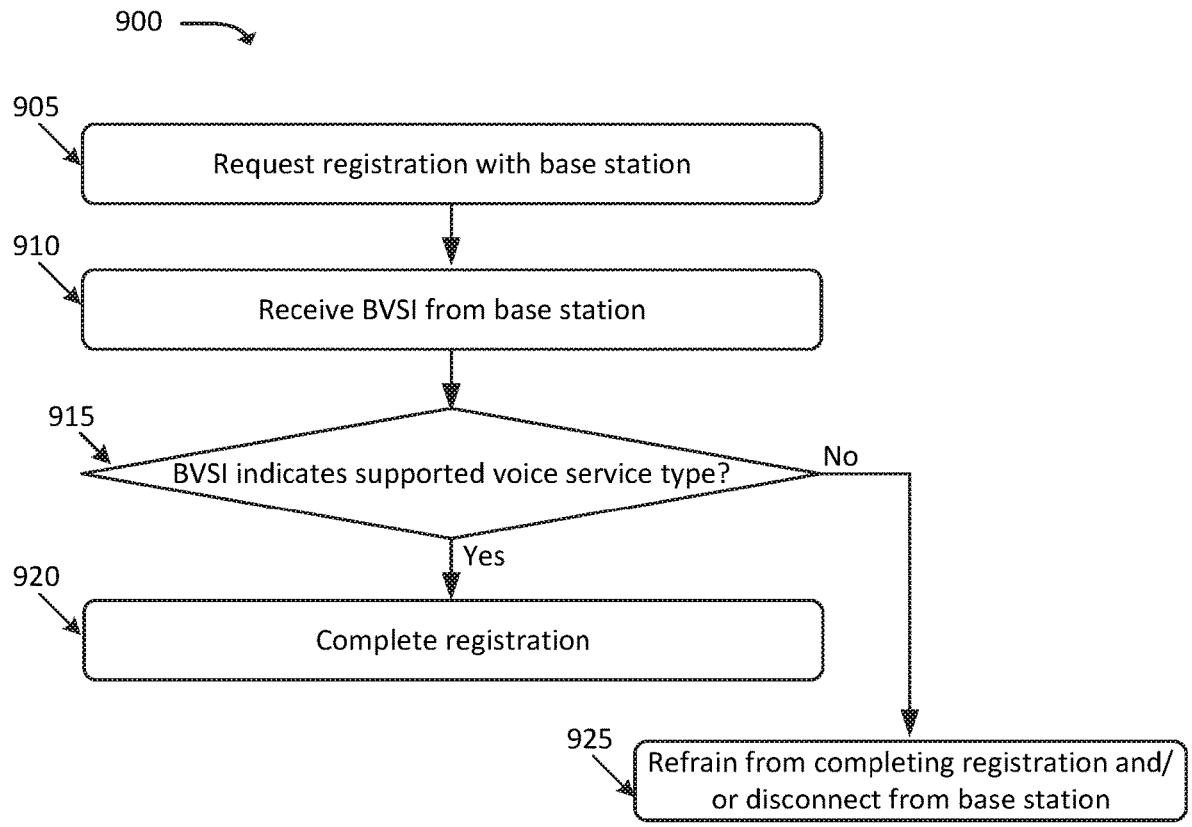
FIG. 9 illustrates an example process for completing and/or refraining from completing a registration process with a base station based on a BVSI provided by the base station during the registration process.

FIG. 9 illustrates an example process 900 for completing and/or refraining from completing a registration process with a base station based on a BVSI provided by the base station during the registration process. In some embodiments, some or all of process 900 may be performed by UE 105. In some embodiments, one or more other devices may perform some or all of process 900 (e.g., in concert with, and/or in lieu of, UE 105).

As shown, process 900 may include requesting (at 905) registration with base station 110. For example, UE 105 may output a NAS REGISTRATION REQUEST message to base station 110 (which may, in some embodiments, be forwarded to an associated AMF 515 and/or MME 516). In some embodiments, UE 105 may output another type of message, such as an RRC CONNECTION REQUEST message, that includes the VSI.

Process 900 may further include receiving (at 910) a BVSI from base station 110. In some embodiments, base station 110 may provide the BVSI based on information stored by base station 110, and/or base station 110 may forward the BVSI as received from AMF 515, MME 516, and/or some other source. The BVSI may be included in a NAS REGISTRATION ACCEPT message and/or some other suitable message.

Process 900 may additionally include determining (at 915) whether the BVSI indicates a voice service type supported by UE 105. If the BVSI indicates a supported voice type (at 915—YES), process 900 may also include completing (at 920) the registration (and/or the registration may not fail on the basis of voice service support, as mentioned above). If, on the other hand, the BVSI does not identify a supported voice type (at 915—NO), then process 900 may further include refraining (at 925) from completing the registration, and/or disconnecting from base station 110 (e.g., in situations where UE 105 has already connected to, or registered with, base station 110).

Figure 10:
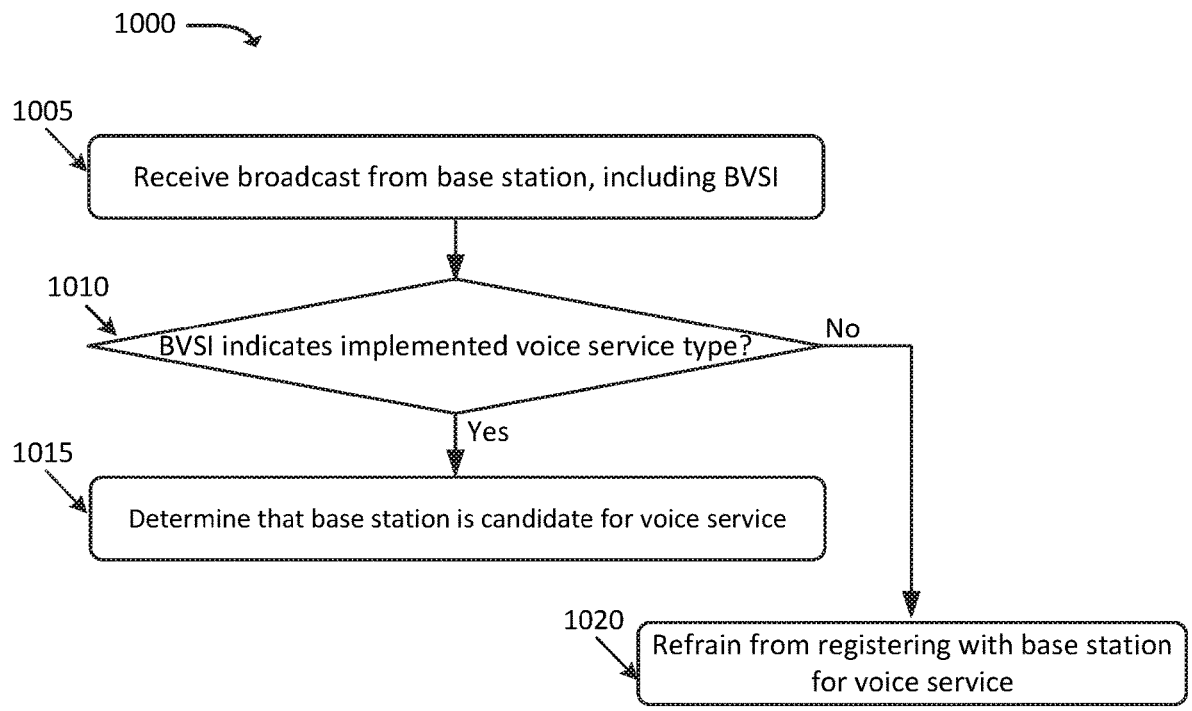
FIG. 10 illustrates an example process for determining whether to request registration with a base station based on whether a BVSI, broadcasted by the base station, indicates a voice service type supported by the UE, in accordance with some embodiments.

FIG. 10 illustrates an example process 1000 for determining whether to request registration with a base station based on whether a BVSI, broadcasted by the base station, indicates a voice service type supported by the UE. In some embodiments, some or all of process 1000 may be performed by UE 105. In some embodiments, one or more other devices may perform some or all of process 1000 (e.g., in concert with, and/or in lieu of, UE 105).

As shown, process 1000 may include receiving (at 1005) a broadcast from base station 110, which includes a BVSI associated with base station 110. For example, UE 105 may detect a SIB, a MIB, and/or some other suitable type of information broadcasted (or otherwise outputted) by base station 110.

Process 1000 may further include determining (at 1010) whether the BVSI indicates a voice service type implemented by UE 105. If the BVSI indicates the voice type service type implemented by UE 105 (at 1010—YES), then process 1000 may include determining (at 1015) that base station 110 is a candidate for voice service. For example, UE 105 may determine that UE 105 should request a connection and/or otherwise establish communications with base station 110. UE 105 may, for example, output a NAS REGISTRATION REQUEST message, an RRC CONNECTION REQUEST message, and/or some other suitable message to base station 110 to establish communications with base station 110.

If, on the other hand, the BVSI does not indicate a voice service type implemented by UE 105 (at 1010—NO), then process 1000 may include refraining (at 1020) from registering with base station 110 for voice service. In some embodiments, even when refraining from registering with base station 110 for voice service, UE 105 may register with (or otherwise connect to) base station 110 for other types of service (e.g., data services). In some such scenarios, UE 105 may concurrently register with another base station 110 for voice service (e.g., may concurrently be connected to two different base stations 110 for different types of service).

Figure 11:
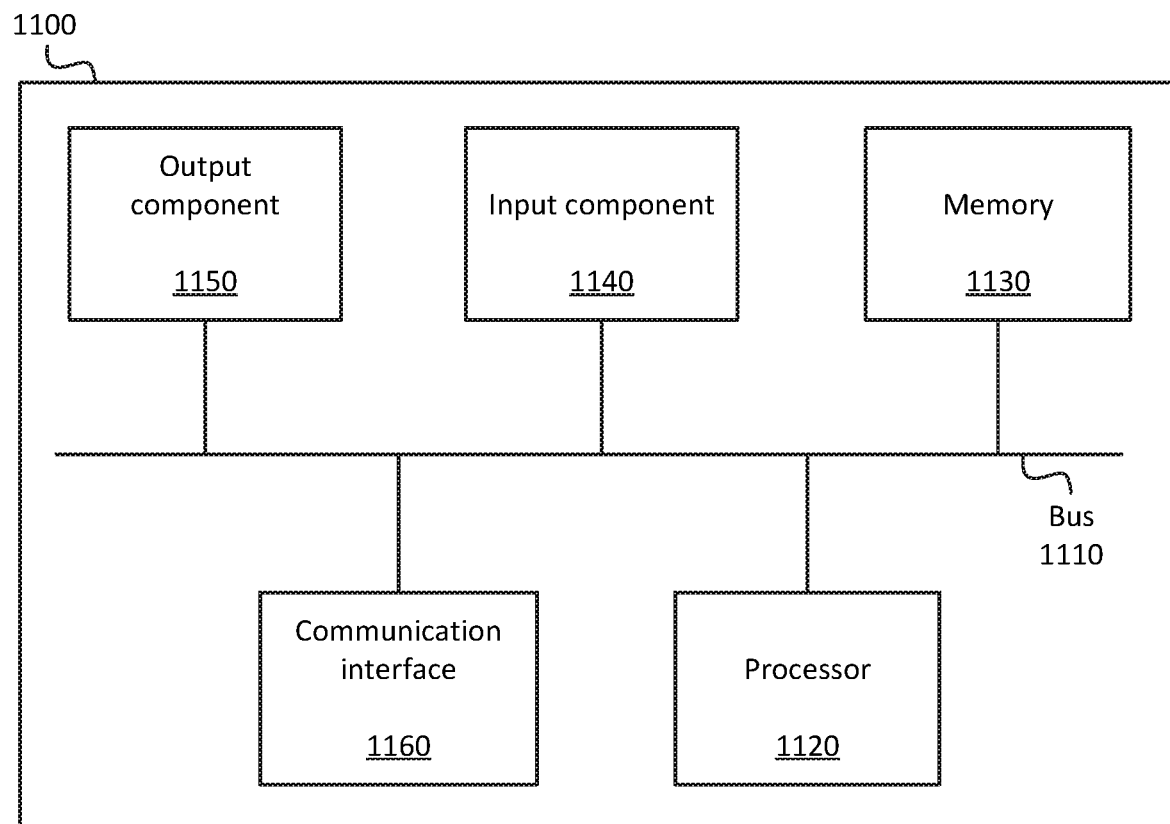
FIG. 11 illustrates example functional components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-4 and 8-10), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a non-transitory computer-readable medium storing a set of processor-executable instructions; and
   one or more processors configured to execute the set of processor-executable instructions, wherein executing the set of processor-executable instructions causes the one or more processors to:
   determine that a first registration request has been received, by a base station of a wireless network, from a first User Equipment ("UE"), wherein the base station supports a first type of packet switch ("PS") voice service out of a plurality of candidate types of PS voice service and does not support a second type of PS voice service out of the plurality of candidate types of PS voice service;
   identify, in the first registration request, a first voice service indicator ("VSI") value, out of a plurality of candidate VSI values, that indicates that the first request is associated with a second type of PS voice service out of the plurality of candidate types of PS voice service and not the first type of PS voice service;
   determine that the first VSI value does not indicate the first PS voice service type supported by the base station;
   deny the first registration request based on determining that the first VSI value does not indicate the first PS voice service type supported by the base station;
   determine that a second registration request has been received by the base station from a second UE;
   identify, in the second registration request, a second VSI value, out of the plurality of candidate VSI values, that indicates that the second request is associated with the first type of PS voice service;
   accept the second registration request based on determining that when the second VSI value indicates the first PS voice service type supported by the base station;
   determine that a third registration request has been received by the base station from a third UE;

identify, in the third registration request, a third VSI value, out of the plurality of candidate VSI values, that is associated with at least the first type of PS voice service and the second type of PS voice service; and accept the third registration request based on determining that the types of PS voice service indicated by the third VSI value include the first PS voice service type supported by the base station.

2. The device of claim 1, wherein the registration request is included in a Non-Access Stratum ("NAS") message sent by the UE.

3. The device of claim 2, wherein the VSI is included in a "UE Usage Setting" string of the NAS message.

4. The device of claim 1, wherein executing the processor-executable instructions further causes the one or more processors to:

broadcast, via the base station, one or more identifiers indicating the supported first type of PS voice service via at least one of:
a Master Information Block ("MIB"), or
a System Information Block ("SIB").

5. The device of claim 1, wherein the plurality of candidate PS voice service types include at least:
Voice over Long-Term Evolution ("VoLTE"), and
Voice over New Radio ("VoNR").

6. The device of claim 1, wherein the first, second, and third VSI values each include at least two bits.

7. The device of claim 1, wherein the third VSI value is further associated with at least one voice service type other than a PS voice service type.

8. A non-transitory computer-readable medium, storing a plurality of processor-executable instructions, which, when executed by one or more processors, causes the one or more processors to:

determine that a first registration request has been received, by a base station of a wireless network, from a first User Equipment ("UE"), wherein the base station supports a first type of packet switch ("PS") voice service out of a plurality of candidate types of PS voice service and does not support a second type of PS voice service out of the plurality of candidate types of PS voice service;

identify, in the first registration request, a first voice service indicator ("VSI") value, out of a plurality of candidate VSI values, that indicates that the first request is associated with a second type of PS voice service, out of the plurality of candidate types of PS voice service and not the first type of PS voice service;

determine that the first VSI value does not indicate the first PS voice service type supported by the base station;

deny the first registration request based on determining that the first VSI value does not indicate the first PS voice service type supported by the base station;

determine that a second registration request has been received by the base station from a second UE;

identify, in the second registration request, a second VSI value, out of the plurality of candidate VSI values, that indicates that the second request is associated with the first type of PS voice service;

accept the second registration request based on determining that the second VSI value indicates the first PS voice service type supported by the base station;

determine that a third registration request has been received by the base station from a third UE;

identify, in the third registration request, a third VSI value, out of the plurality of candidate VSI values, that is associated with at least the first type of PS voice service and the second type of PS voice service; and accept the third registration request based on determining that the types of PS voice service indicated by the third VSI value include the first PS voice service type supported by the base station.

9. The non-transitory computer-readable medium of claim 8, wherein the registration request is included in a Non-Access Stratum ("NAS") message sent by the UE.

10. The non-transitory computer-readable medium of claim 9, wherein the VSI is included in a "UE Usage Setting" string of the NAS message.

11. The non-transitory computer-readable medium of claim 8, wherein the processor-executable instructions further include processor-executable instructions to:

broadcast, via the base station, one or more identifiers indicating the supported first type of PS voice service via at least one of:
a Master Information Block ("MIB"), or
a System Information Block ("SIB").

12. The non-transitory computer-readable medium of claim 8, wherein the plurality of candidate PS voice service types include at least:
Voice over Long-Term Evolution ("VoLTE"), and
Voice over New Radio ("VoNR").

13. The non-transitory computer-readable medium of claim 8, wherein the first, second, and third VSI values each include at least two bits.

14. A method, comprising:
determining that a first registration request has been received, by a base station of a wireless network, from a first User Equipment ("UE"), wherein the base station supports a first type of packet switch ("PS") voice service out of a plurality of candidate types of PS voice service and does not support a second type of PS voice service out of the plurality of candidate types of PS voice service;

identifying, in the first registration request, a first voice service indicator ("VSI") value, out of a plurality of candidate VSI values, that indicates that the first request is associated with a second type of PS voice service, out of the plurality of candidate types of PS voice service and not the first type of PS voice service;

determining that the first VSI value does not indicate the first PS voice service type supported by the base station;

denying the first registration request based on determining that the first VSI value does not indicate the first PS voice service type supported by the base station;

determining that a second registration request has been received by the base station from a second UE;

identifying, in the second registration request, a second VSI value, out of the plurality of candidate VSI values, that indicates that the second request is associated with the first type of PS voice service;

accepting the second registration request based on determining that the second VSI value indicates the first PS voice service type supported by the base stations;

determining that a third registration request has been received by the base station from a third UE;

identifying, in the third registration request, a third VSI value, out of the plurality of candidate VSI values, that is associated with at least the first type of PS voice service and the second type of PS voice service; and accepting the third registration request based on determining that the types of PS voice service indicated by the third VSI value include the first PS voice service type supported by the base station.

15. The method of claim 14, wherein the registration request is included in a Non-Access Stratum ("NAS") message sent by the UE.

16. The method of claim 15, wherein the VSI is included in a "UE Usage Setting" string of the NAS message.

17. The method of claim 14, further comprising:
broadcasting, via the base station, one or more identifiers indicating the supported first type of PS voice service via at least one of:
a Master Information Block ("MIB"), or
a System Information Block ("SIB").

18. The method of claim 14, wherein the first, second, and third VSI values each include at least two bits.

19. The method of claim 14, wherein the third VSI value is further associated with at least one voice service type other than a PS voice service type.

20. The method of claim 19, wherein the plurality of candidate VSI values further include a fourth VSI value that is associated with the only first and second PS voice service types.

* * * * *